No. 644,520. Patented Feb. 27, 1900.
C. C. JONES.
BRICK MAKING PLANT.
(Application filed Sept. 14, 1899.)
(No Model.) 7 Sheets—Sheet 1.
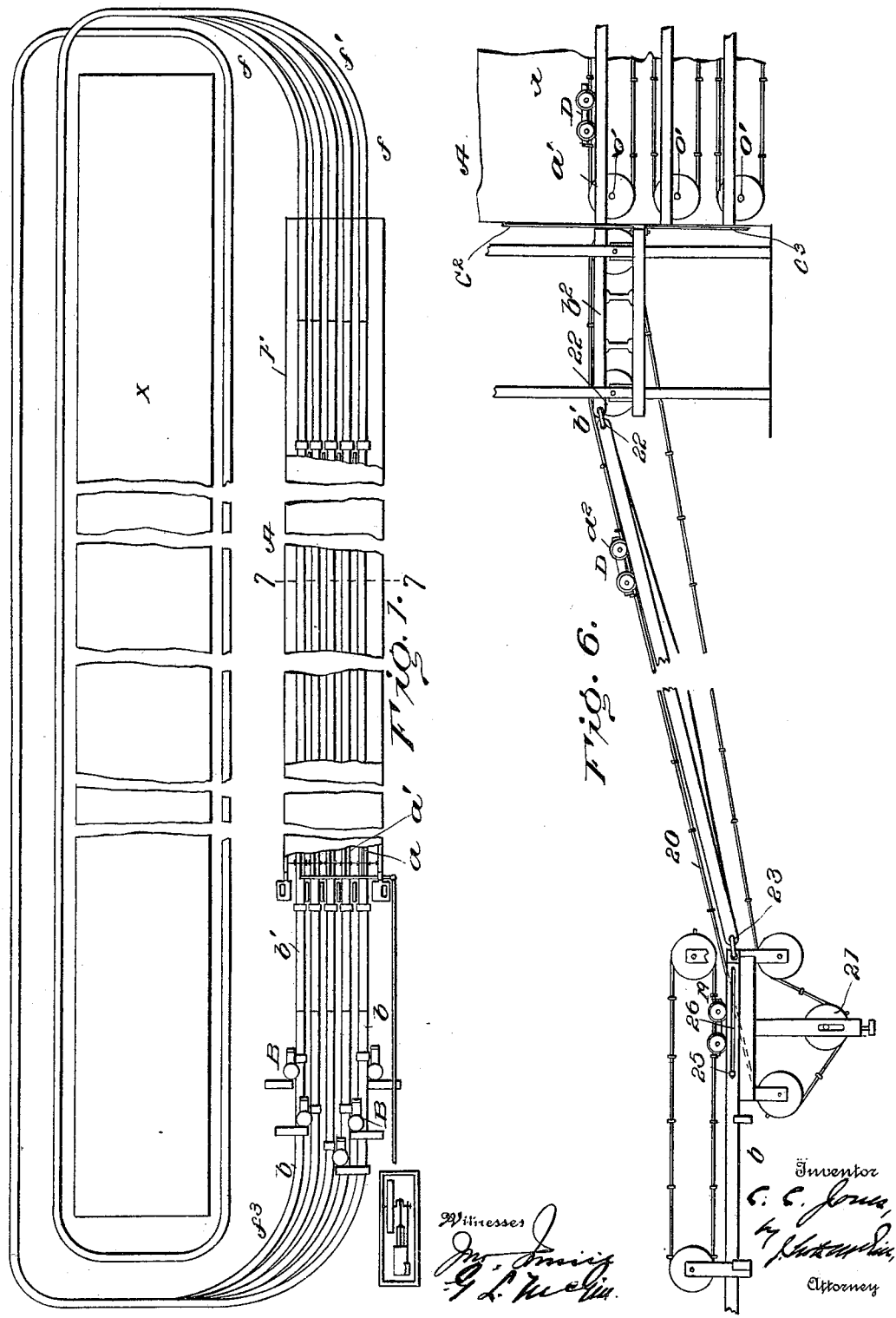

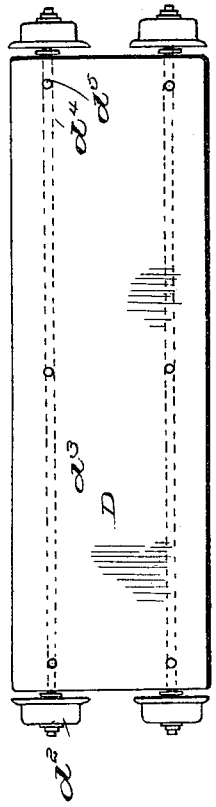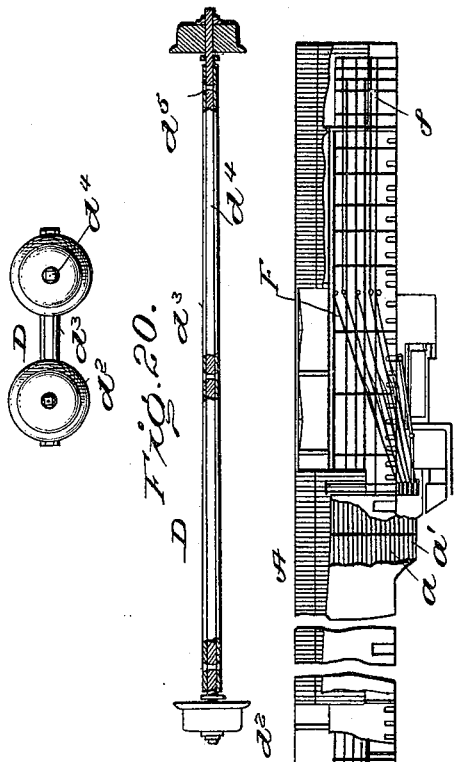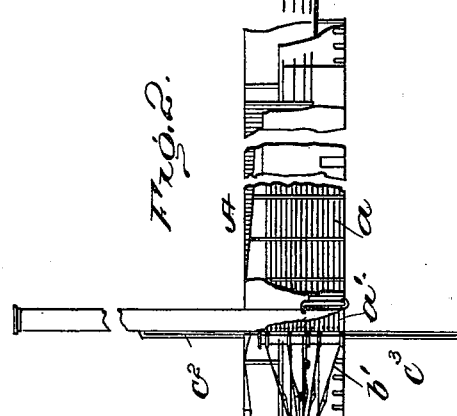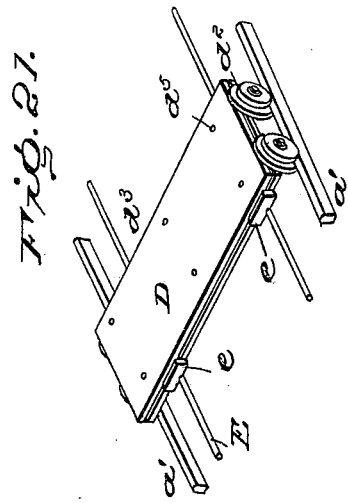

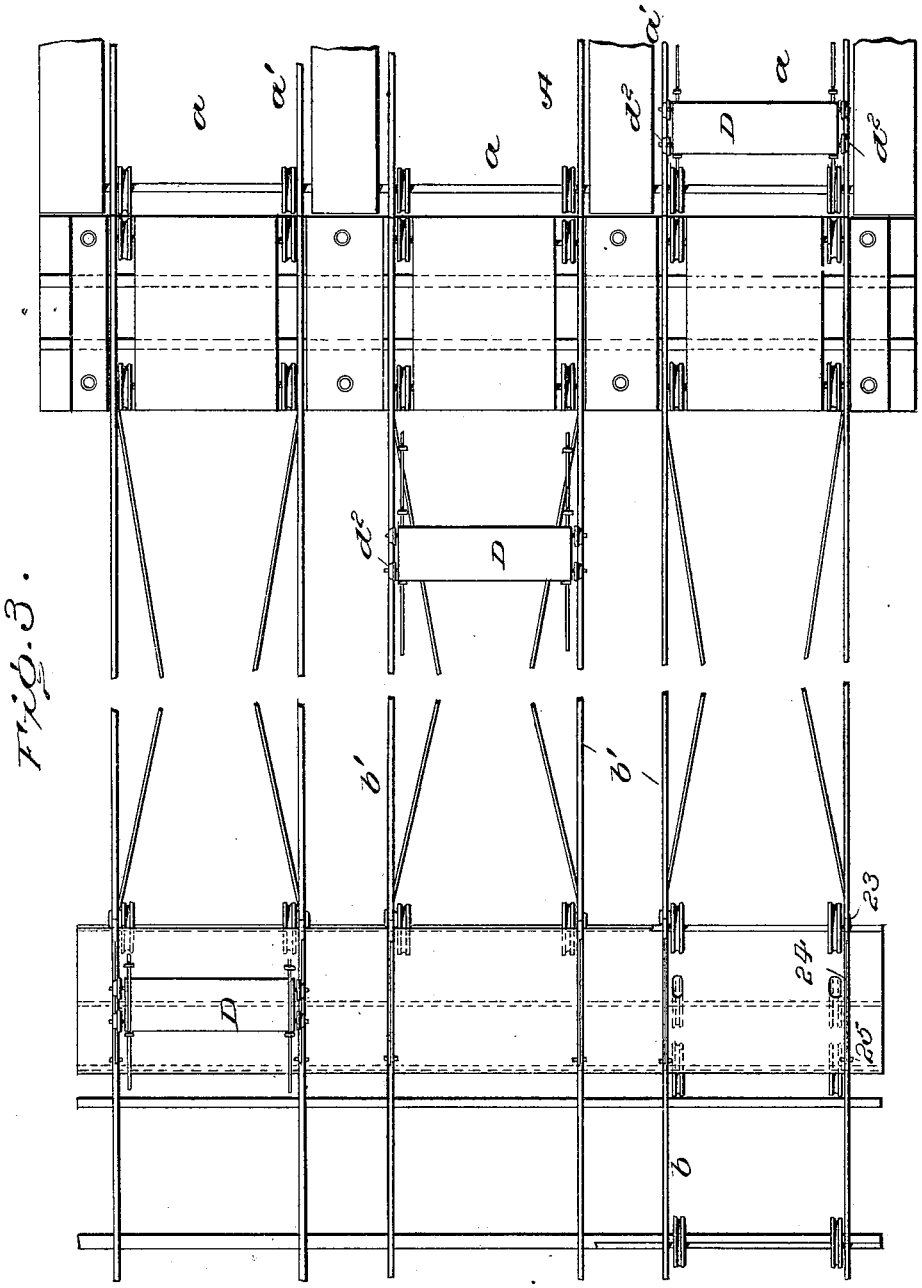

No. 644,520. Patented Feb. 27, 1900.
C. C. JONES.
BRICK MAKING PLANT.
(Application filed Sept. 14, 1899.)
(No Model.)
7 Sheets—Sheet 4.
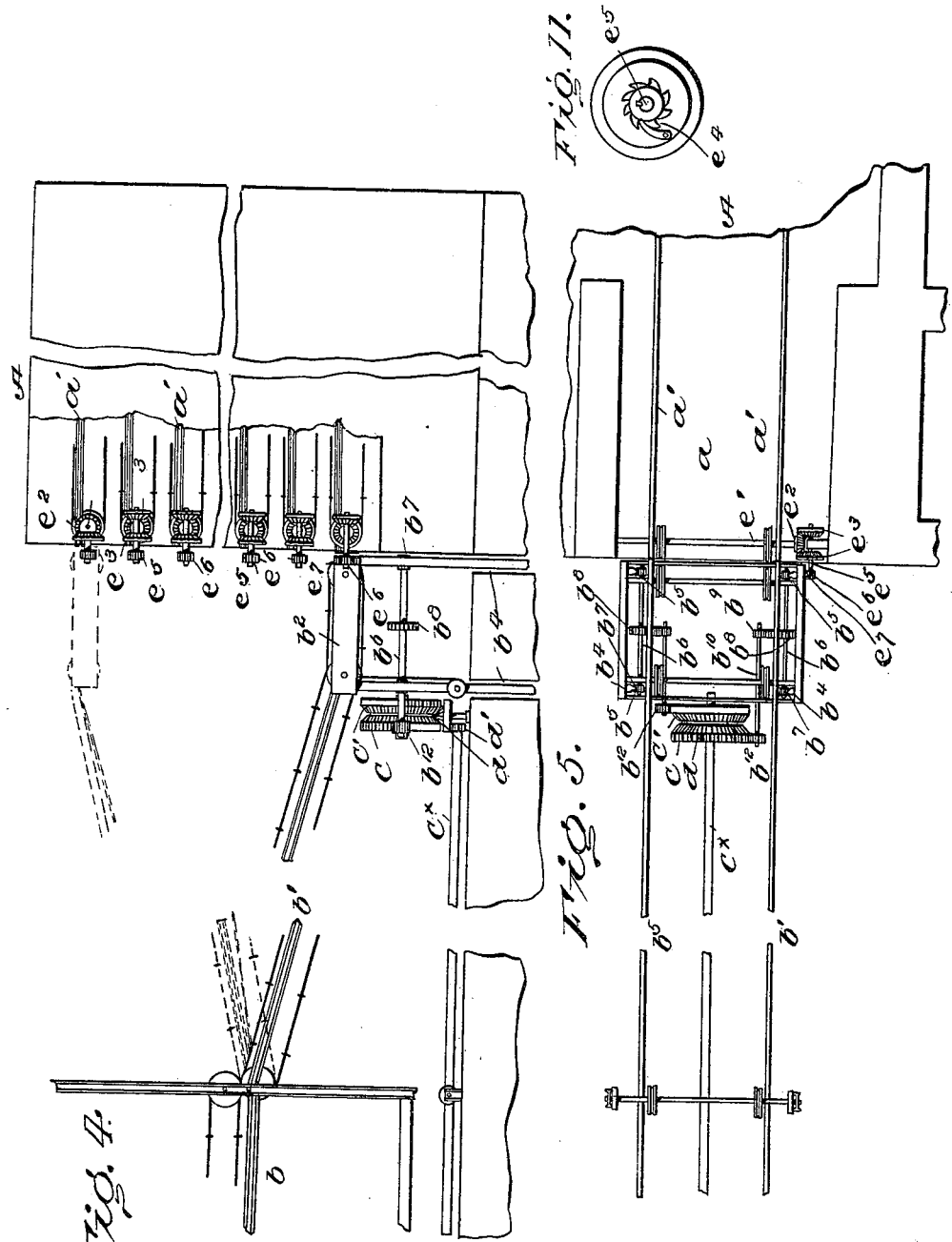

No. 644,520. Patented Feb. 27, 1900.
C. C. JONES.
BRICK MAKING PLANT.
(Application filed Sept. 14, 1899.)
(No Model.) 7 Sheets—Sheet 5.

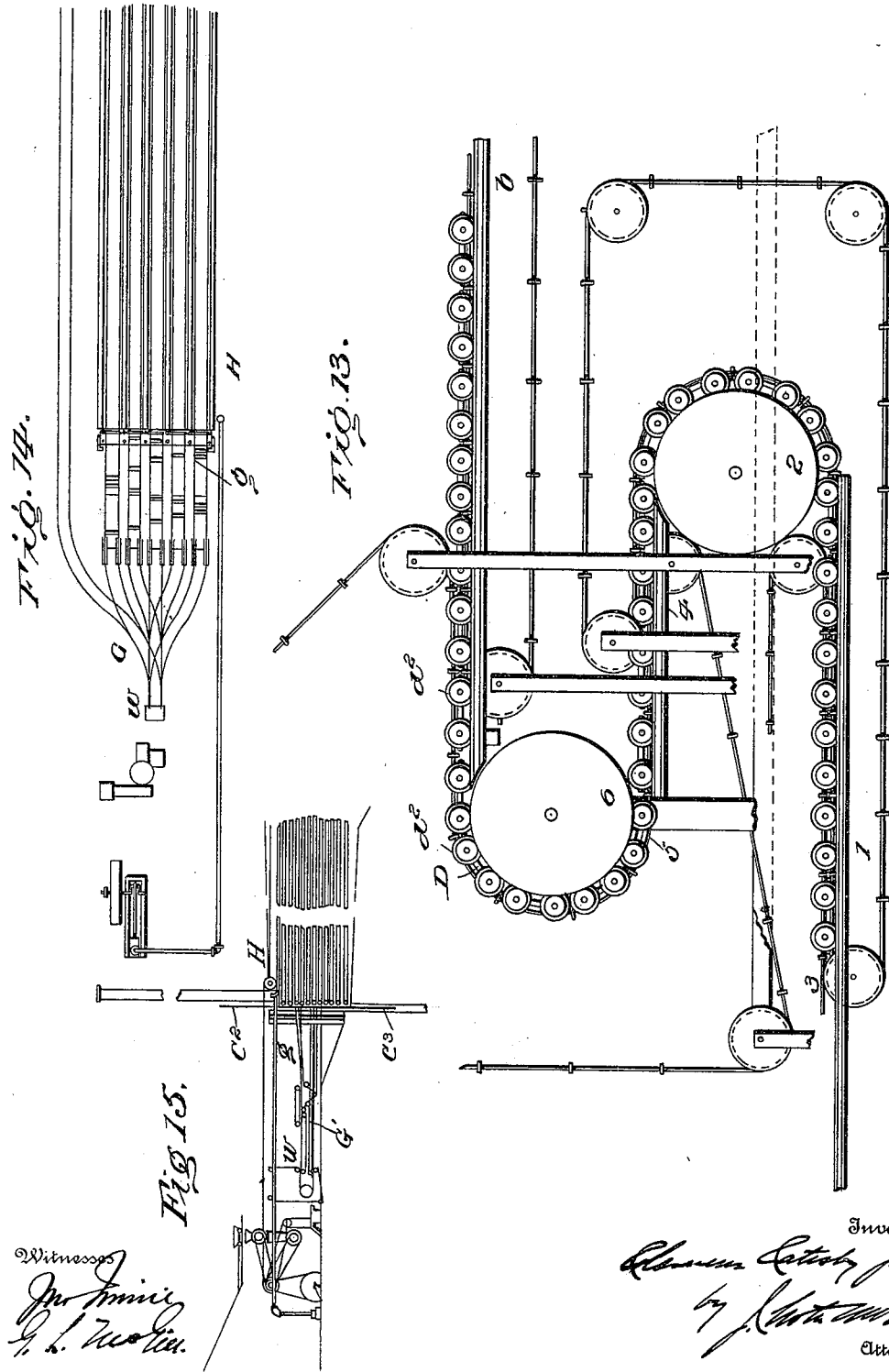

No. 644,520. Patented Feb. 27, 1900.
C. C. JONES.
BRICK MAKING PLANT.
(Application filed Sept. 14, 1899.)
(No Model.) 7 Sheets—Sheet 7.

Witnesses
Inventor
Attorney

UNITED STATES PATENT OFFICE.

CLEMENS CATESBY JONES, OF RICHMOND, VIRGINIA.

BRICK-MAKING PLANT.

SPECIFICATION forming part of Letters Patent No. 644,520, dated February 27, 1900.

Application filed September 14, 1899. Serial No. 730,464. (No model.)

*To all whom it may concern:*

Be it known that I, CLEMENS CATESBY JONES, of Richmond, in the county of Henrico and State of Virginia, have invented certain new and useful Improvements in Brick-Making Plants; and I do hereby declare the following to be a full, clear, and exact description of the invention, such as will enable others skilled in the art to which it appertains to make and use the same.

This invention contemplates certain new and useful improvements in brick-making plants.

The primary object of the invention is to provide an entirely mechanical system in the making of bricks by which the green bricks are transported continuously and regularly in proper condition to the burning-kilns without handling between the time they leave the forming or making machines and are dried by natural or artificial heat to the time they are introduced into the kilns to be set and burned, and again, without interrupting the foregoing operation, to transport the burned bricks in like manner and in turn from the kilns to the shipping dock or station.

A further object is to provide a mechanical system for the manufacture of bricks which can be adapted to any plant, location, raw materials, or process of manufacture, subject only to the limitations of arrangements of transporting-tracks.

A further object is to lessen the number of handlings of the green and burned bricks, insuring a condition in the finished product hitherto unattained.

A further object is to reduce to a minimum the number of laborers heretofore employed in the making of bricks.

A further object is to condense and centralize the arrangement of operating power and machinery and to maintain a maximum economy, compactness, and efficiency of plant.

A further object is to minimize the area of ground required for a brick-making plant; and a further object is to provide an improved reversible pallet for transporting the bricks.

The invention will be hereinafter fully set forth, and particularly pointed out in the claims.

Figure 7:
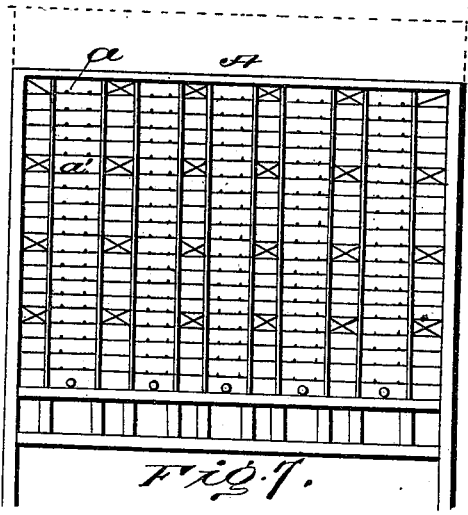
Figure 8:
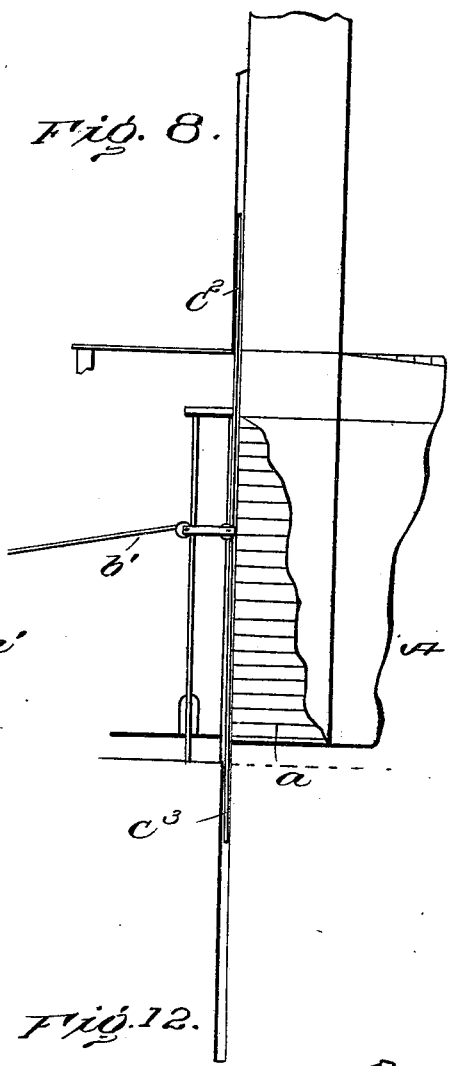
Figure 9:
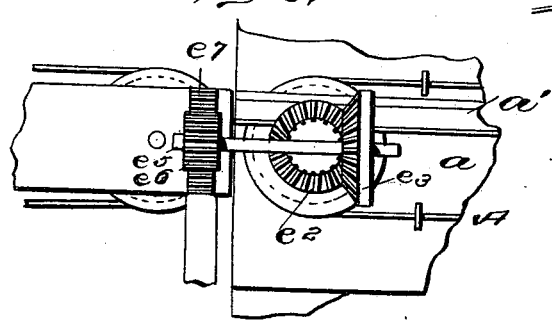
Figure 10:
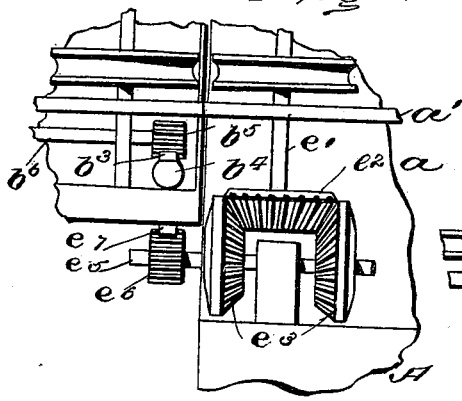
Figure 12:
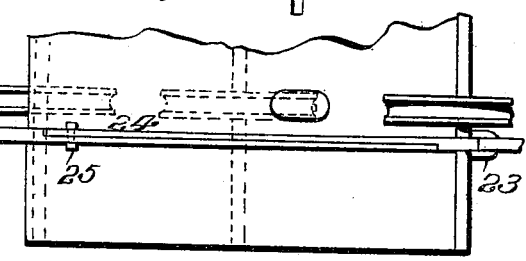
Figure 76:
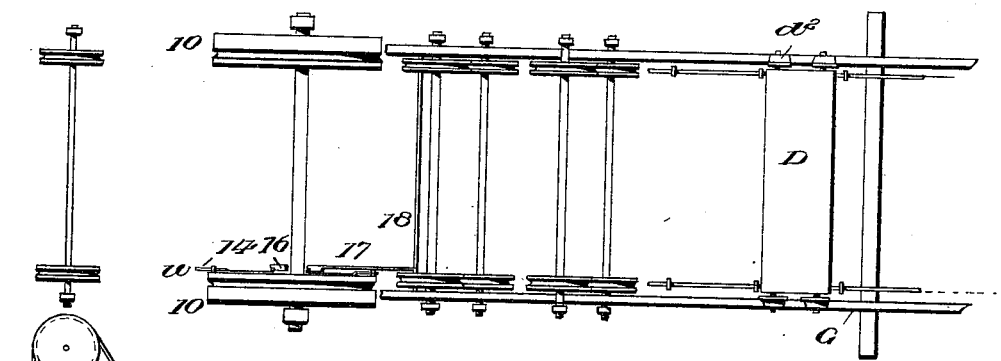
Figure 77:
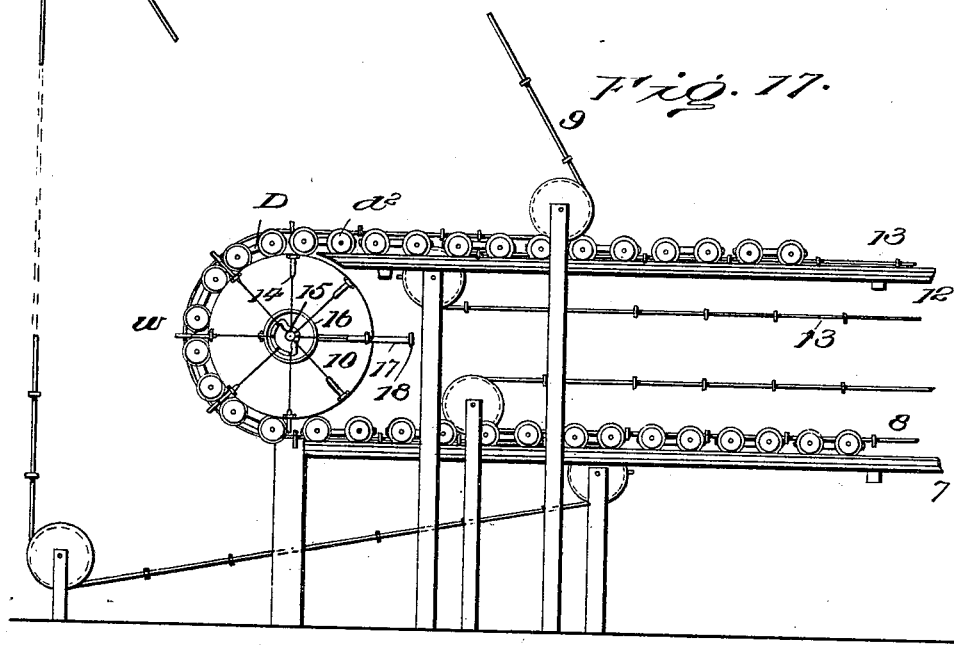

In the accompanying drawings, Figures 1 and 2 are diagrammatical views of the system employing a plurality of brick-making machines and separate track-circuits, Fig. 1 being in plan and Fig. 2 in side elevation. Fig. 3 is a plan view, on an enlarged scale, showing the movable track-sections. Fig. 4 is an enlarged view of the receiving end of the drier and portions of the movable track-sections. Fig. 5 is a plan view thereof, showing portions of one track-section and the complementary tunnel. Fig. 6 is an enlarged view of one of the track-sections and its adjuncts. Fig. 7 is a transverse sectional view of the drier, taken on line 7 7, Fig. 1. Fig. 8 shows in side elevation the doors for closing the end of a tunnel. Figs. 9 and 10 are enlarged views of the mechanism for moving the pallet-conveyers in the tunnels. In Fig. 10 is shown the arrangement for the intermediate track-levels, while Fig. 9 shows the means employed in the lowermost track-level. Fig. 11 is a detail thereof. Fig. 12 is an enlarged view showing the connection between a stationary rail and that of one of the movable track-sections. Fig. 13 is an enlarged view of the arrangement of tracks, ropes, and wheels at the point where the bricks are placed in the pallets as they leave the making or forming machine. Figs. 14 and 15 are respectively plan and side diagrammatic views showing a modification for a single brick-making machine and multiple-track arrangement. Fig. 16 is a plan, and Fig. 17 a side view, of the arrangement at point of loading fresh bricks on the pallet in accordance with the modified plan shown in Figs. 14 and 15. Fig. 18 is a plan view of one of the pallets. Fig. 19 is an end view, and Fig. 20 a longitudinal sectional view, thereof. Fig. 21 shows in perspective a pallet on a track with conveyer-ropes engaging therewith.

Heretofore in the manufacture of bricks it has been customary to mount the bricks as they leave the forming-machine on a pallet, which latter is placed upon a wheeled truck and by this means conveyed, according to one method, to a drying-floor, or, according to a second method, to drying-racks, where natural heat is employed to dry the bricks, or to a drier, by a third method, where artificial heat is used. The first method of drying requires the bricks to be removed from the pallets and placed on the drying-floor and the pallets returned to the machine. When partially dry, each brick on the floor must be turned on its edge and when still further dried be piled up in "hacks." When sufficiently dry to be set, the green bricks are piled on barrows and wheeled to the kilns. The use of drying-racks differs from this only in employing wooden frames built vertically to receive several pallets one above the other, on which the pallets remain until the bricks are dry, the latter being "edged" on the pallets when they can be handled. When dry, the bricks are transferred to the kilns as in the first case, and the pallets are returned to the machine or remain on the racks. In both of these methods the bricks are made by what is known as the "soft-mud" process and are dried in the open air. The amount of drying-space occupied is very large, besides which these methods involve numerous other disadvantages aside from the handling. When a drier is used with artificial heat, the pallets when filled with bricks at the machine are placed upon wheeled trucks, called "rack" or "crab" cars, which are provided with slides or cleats for supporting, usually, seventy-two pallets. When a complement of wood or steel pallets have been placed upon the trucks, the latter are pushed along the tracks, passing through a drier. When the necessary amount of moisture has been expelled from the bricks, the trucks are drawn out in order at the delivery end of the drier and conveyed to the kilns, where the bricks are removed from the pallets. After the pallets have been replaced on the truck the latter is conveyed back to the machine. Before a truck can be again loaded the pallets must be removed and each pallet placed separately at the proper point to receive a fresh supply of bricks. In the soft-mud process the bricks are placed on the pallets six at a time, delivered from the mold on their flat sides. In the "stiff-mud" (plastic or wire-cut) process the bricks may be delivered upon the pallets usually ten at a time, standing on "edge;" but they are generally spaced by hand or placed separately upon the pallets. The wire-cut bricks may be dried by any of the methods described. In dry-press or semidry-press processes the bricks are usually placed on pallets which are transferred to wheeled trucks, as described, and passed through a drier. In all of the different processes the handling of green bricks occurs several times and is the source of a large item of cost heretofore unavoidable. For instance, in all of the pallet systems described the amount of handling by the simplest and most direct method is about as follows: placing the bricks on the pallets, placing the pallets on a wheeled truck, transferring the trucks to a drier, from the drier to the kilns, removing the bricks from the pallets, replacing the pallets on the trucks, transferring the trucks back to the machine, removing all the pallets from the trucks, and finally arranging all the pallets separately to receive a fresh supply of bricks, requiring separate laborers for each operation.

The method of removing the burned bricks from the kilns is practically the same by whatever process the green bricks are made and usually consists in piling them upon barrows or wheeled trucks, by which they are transported to the shipping dock or station. This again requires separate laborers to load the bricks on the barrows, separate laborers to wheel the barrows, and separate laborers to remove the bricks from the barrows and pile them properly.

By my present invention I dispense with the use of a separate truck and separate pallets by mounting each pallet upon wheels movable on tracks which extend singly or in series from the brick-making machine or machines to the various tunnels of a drier, thence to the kilns or any other objective point about a plant, each pallet being moved on its tracks by any suitable mechanical means, preferably ropes having stops or cleats which engage the several pallets. The several ropes employed throughout the entire plant have imparted to them a differential movement, so that at various stages the pallets may be moved either fast or slow or only periodically advanced, as conditions require. The several pallets are mounted in vertical columns in separate tunnels of a drier and are gradually advanced through the latter, upon leaving which they travel in series in one vertical plane, if desirable, to the kiln or kilns. It is here that the bricks are handled for the first time after being placed upon the pallets. They are removed from the pallets into the kilns and after being sufficiently burned are again piled upon the empty pallets, which latter travel over smooth tracks to the dock or station with the bricks ready for shipment. The pallets after leaving the stationary tracks adjacent to the brick-making machines are carried upon any one of a series of shiftable track-sections, which are mechanically operated in such manner that the several pallets will be supplied to the several tunnels of the drier in vertical series— that is, after one of the series of tracks in a tunnel receives its supply of pallets the track-section complementary thereof is shifted to a different altitude, so as to supply the pallets to another track. In this way the tunnels are filled from end to end and from the bottom to the top, or vice versa. Upon leaving the drier the pallets are conveyed over movable track-sections to a series of stationary tracks on different altitudes, but in vertical line with each other, and from the pallets on these tracks which pass along the kilns the bricks are taken and placed within the kilns.

In the drawings I have illustrated two ways by which my invention may be carried out— to wit, a plan comprehending a plurality of brick-making machines with separate track-circuits, and, secondly, a single brick-making machine and a multiple-track circuit leading therefrom. The former plan is adapted for large plants, while the second plan is for one of lesser capacity.

I do not limit myself to any details of construction of the various mechanical parts and have only shown in the drawings such arrangements as are necessary to enable one skilled in the art to construct and operate large and small plants embodying my improvements.

Referring to the drawings, A designates a drier which is composed of a series of separate tunnels $a$, in each of which is a series of tracks $a'$, arranged one above the other and filling the space from the bottom to the top of each tunnel. (See Figs. 2 and 3.)

In Fig. 1, B designates several brick-making machines, which may be of any preferred pattern. Adjacent each machine B is a stationary track $b$, with each of which, at its forward end, is connected a movable track-section $b'$. Each of these sections $b'$ is capable of being raised and lowered at its outer end over the receiving end of drier A independent of the other sections, so that it may be brought in line with any one of the series of tracks in the tunnel of which it forms a complementary part. Any suitable means may be employed for effecting the raising and lowering of each movable track-section. I have shown the outer horizontal portion $b^2$ of each movable track-section as having rack-bars $b^3$ attached to bars $b^4$ at its several corners. With adjacent rack-bars mesh pinions $b^5$, fast on a shaft $b^6$, having its bearings in stationary frame-pieces $b^7$. With a gear-wheel $b^8$, mounted on each shaft $b^6$, meshes a gear-wheel $b^9$, whose shaft $b^{10}$ is driven by a pinion $b^{12}$, meshing with the segmental toothed portion of one of two drive-wheels C C'. These latter wheels are mounted on a common shaft, and their opposed edges are beveled and toothed, so that they may be driven in unison by a beveled pinion $d$, with which latter meshes a pinion $d'$ on a driving-shaft C$^\times$. The rotation of wheels C C' will effect the raising and lowering of the platform end of the track-section to which it belongs. The wheels C C' are segmentally toothed to alternately raise and lower the movable track-sections, but one pinion $b^{12}$ at a time being in engagement with its coacting toothed portion. Suitable holes in the soil or floor are arranged to accommodate the bars $b^4$ when moved below the floor. A similar arrangement is provided for each track-section. To each track-section, at its platform end, are secured two vertical sliding doors C$^2$ C$^3$, with an intervening space between their inner adjacent ends sufficient to allow a pallet to pass onto one of the tracks of one of the tunnels, the doors serving to close the receiving ends of the several tunnels beyond the space required for the admission of a pallet. In this way the loss of heat from the drier is reduced to a minimum.

Each pallet D is of oblong formation and is mounted at its ends on wheels $d^2$, which are movable over the track $b$, track-sections $b'$, and the track-rails of the several tunnels. For lightness and durability the body of each pallet is composed of two thin parallel plates $d^3$, between which are interposed longitudinal bars $d^4$, having their projecting ends rounded to form axles for the wheels $d^2$, and may be made of wood, iron, or steel, preferably the latter. The two plates and axle-bars of each pallet are secured together by bolts or rivets $d^5$ and form a reversible roller-pallet, either side of which may be used. By means of this construction the bricks as they leave the brick-machines are placed upon the pallets, six bricks to each pallet by the soft-mud process and ten bricks or more by any other process. The pallets may be moved over the rails by any suitable means, but I preferably employ endless wire ropes E, having cleats or buttons $e$, which engage the longitudinal edges of the pallets, and thus transport the latter over the rails. These conveying-ropes may be driven by any suitable means, either uniformly or at differential speeds, throughout the entire plant. For instance, from the time the pallets are supplied with bricks and pass onto the shiftable track-sections $b'$ they are moved at a uniform maximum speed of about fifteen feet per minute, while when they enter any one of the several tunnels of the drier their speed is decreased, so that their transportation through the drier will be slow and allow for a uniform supply to the several tracks of each tunnel and also permit of the thorough drying of the bricks. For this reason the conveying-ropes within the several tunnels travel at a slower speed than those by which the pallets are moved from the brick-machines to the receiving end of the drier. In the arrangement of separate circuit-tracks the speed in each tunnel is independent of the speed in the other tunnels. The ropes in each tunnel are moved as its track-section $b'$ is brought into line therewith a sufficient distance to allow of the introduction of a pallet. On the roller-shaft $e'$, at the receiving end of each track of each tunnel, is a beveled pinion $e^2$, which (save at the top and bottom of each tunnel) meshes with two beveled pinions $e^3$, having a pawl-and-ratchet connection $e^4$ with a common shaft $e^5$, on which is a pinion $e^6$. The latter is engaged by a short rack-bar $e^7$, carried by each track-section. Hence as the shaft $e^5$ is revolved the shaft $e'$ is turned, so as to move the ropes sufficient to provide for the introduction of a fresh pallet. As the track-sections are moved upward their rack-bars $e^7$ upon engaging pinions $e^6$ will rotate shafts $e^5$, and one of the pinions $e^3$, turning with said shaft, (being locked thereto by its pawl and ratchet,) will, through pinion $e^2$, effect the rotation of shaft $e'$; but when the track-section is moved downward the other pinion $e^3$ will rotate with shaft $e^5$, to which it is then locked by its pawl-and-ratchet connection, and effect a similar movement of shaft $e'$. Hence as one of the pinions $e^3$ is locked to shaft $e^5$ by the pawl-and-ratchet connection the other pinion is free to be rotated in a direction the reverse of that of its shaft. The shaft $e'$ of the top and bottom tracks of each tunnel have each but one pinion $e^3$. (See Figs. 4 and 9.) The top and bottom track-levels terminate the upward-and-downward movement of the movable track-sections, from which latter is ejected one pallet at each level. The intermediate track-levels receive two pallets in one upward-and-downward movement of the movable track-sections, the top and bottom levels being supplied with but one pallet when the track-sections are brought into alinement therewith. Hence the shafts $e'$ of the top and bottom track-levels are rotated only upon the approach of the track-sections and not when the latter are reversed. It will be understood, of course, that the pallets may be distributed to the different track-levels in any desirable order.

From the discharge end of the drier the pallets pass from one track at a time of each tunnel onto the receiving end of a movable track-section F and by the conveyer-ropes of the latter are carried outwardly onto any one of the five stationary tracks $f$, which are on different horizontal planes and are curved, as at $f'$, Fig. 1, so as to bring all of them in the same vertical line. In this way the tracks are extended around both sides of the space X provided for the kilns, and in like manner continued outwardly in parallel lines to the kilns in convenient relation to a dock or station from which the bricks are to be transported. These tracks are thus continued until they are again curved outwardly, as at $f^3$, and all brought into the same horizontal plane at the points of location of the brick-machines. As the pallets pass upon the discharge track-sections F and are conveyed around to one side of the space X in vertical line with each other operatives at each kiln remove the bricks from the pallets for setting in the kiln at the several altitudes where they are required. The pallets continuing their journey after the bricks are removed and passing around to the other side of the kilns may be supplied with bricks already sufficiently burned and in this way conveyed to the point of delivery for transportation.

In Fig. 13 I have shown, on an enlarged scale, the arrangement of tracks and conveyer-ropes at the point of loading the pallets adjacent each brick-machine. The pallets returning in rear of each machine along the tracks 1 are carried around wheels 2 by ropes 3 onto track 4, where they are taken up by ropes 5 around wheels 6 onto track $b$. As the pallets pass over the wheels 6 the bricks are placed upon them—that is, where they are made by other than the "soft-mud" process. The arrangement for the latter comprehends the use of supporting-rods against which the molds rest in dumping the bricks onto the pallets before the latter reach the top of wheels 6. This construction is illustrated in Figs. 16 and 17 and will be described in connection therewith.

The plan hereinbefore described contemplates the employment of a plurality of brick-making machines such as are used where bricks are produced in large numbers, and in this case each machine supplies the bricks to pallets moving over an arrangement of tracks in separate circuits at uniform speed except in the tunnel—that is, the pallets are mounted on a vertical series of tracks in a single tunnel and pass therefrom to a single track at any given altitude, by which they pass around the kilns and thence back to the machine. I have also illustrated in the drawings the embodiment of my invention in a plant of less capacity where but a single brick-making machine is used, with an arrangement of tracks in multiple circuit at different speeds—that is, as the pallets are distributed to several tunnels and pass therefrom to several tracks at different altitudes which again converge to a single track at the machine. In this arrangement, which is shown in Figs. 14 to 17, the bricks are placed upon each pallet as it approaches the point $w$, from which the pallet travels over any one of a series of five stationary tracks G, onto which it may be switched. The tracks G have each as a continuation thereof a track-section $g$, which at its outer platform end is movable vertically over the receiving end of the drier H, whereby the pallets from each track-section will be supplied to the several series of tracks in each tunnel, the pallets being so shifted onto the several tracks that the supply to the several tunnels will be practically uniform. These track-sections at their platform ends also carry vertically-movable doors for confining the heat within the drier and allowing only sufficient space for the entrance onto one track of each tunnel at a time and are in general similar to the track-sections before described. The remaining features are similar to those described in connection with the plant having a plurality of brick-making machines.

Figs. 16 and 17 show, on an enlarged scale, the arrangement existing at the point where the bricks are loaded on each pallet as it passes in front of the single brick-making machine. The pallets are returned along the lower track 7 by the rope 8, and as they approach the point of reversal of such rope they are taken up by the rope 9 and carried around wheels 10 onto the upper track 12, and just before being freed of rope 9 they are taken up by rope 13 and by the latter conveyed to the movable track-section and out to the outer end of the latter. In this arrangement I have shown means for use in connection with the soft-mud process. Mounted upon each of the wheels 10 is a series of rods 14, the inner ends of which latter travel in a cam-groove 15 of a disk 16 at the center of each wheel, on the inner side, each disk being supported by arms 17, projecting from a cross-rod 18. This cam-groove forces outwardly the several rods as they reach the lowermost point on the periphery of the wheel and holds them extended until they travel to near the upper plane of movement. When thus extended, the several rods are projected between the several pallets, being carried around the wheels 10, and serve to support the mold, which is rested upon them, against the pallet when the latter is at the horizontal center, the mold being removed at the vertical center. It will be noted that the pallets as they pass over wheels 10 present the side not before used. This is one advantage in making the pallets reversible and mounting them on rollers.

In Figs. 3, 6, and 12 I have shown, on an enlarged scale, the arrangement for carrying the pallets onto one of the shiftable track-sections, especially the form described in connection with a plurality of brick-making machines. As the pallets approach the movable track-sections they are conveyed by the rope 19, and as they pass onto such sections they are taken up by a rope 20, which latter in addition to the ordinary rollers over which it is passed also engages a lazy-pulley 21. It will be observed by reference to these figures that the inclined portions of these track-sections are linked at their outer ends, at the points 22, to their horizontal platforms. At their other ends these track-sections are each linked at the points 23 to bars 24, held against the adjacent rails of its complementary track by nutted bolts 25, passed through slots 26 in such rails. This compensatory connection allows of the vertical shifting of the track-sections without interfering with the continuity of the rails.

In operation the bricks as they leave the brick-making machines are placed upon the flat pallets on the adjacent tracks, such pallets then being moved at a rate of speed to permit of this being done. The pallets thus loaded with the bricks pass onto the movable track-sections and over the latter onto those tracks of the drier with which the discharge ends of track-sections are in alinement. As these track-sections are brought into alinement with the different tracks in the several tunnels the conveyer-ropes contiguous to these latter tracks move forward the pallets previously deposited therein a sufficient distance to permit of the introduction of a fresh pallet. In this way the pallets and the bricks thereon are supplied to and travel through the drier. This passage of the bricks through the drier is at a gradual speed to permit of the thorough drying of the bricks. As the pallets reach the discharge ends of the drier they pass onto a second set of movable track-sections and over the latter to a series of tracks by which they are brought in one vertical plane around the kiln. On one side of the latter the bricks, fresh from the drier, are removed and placed within the kiln for burning. The pallets continue on their journey around the other side of the kiln, where they may be supplied with previously-burned bricks, which are then conveyed away from the kiln to any suitable point of discharge, the pallets continuing on their journey through the several tracks until they are again presented to the brick-making machine. In the second plan herein outlined—namely, where a single brick-making machine is employed—the pallets upon leaving the machine are switched onto any one of a series of tracks, over which they travel to the movable track-sections. In all other essentials the operation is practically the same in both plans.

The advantages of my invention are apparent to those skilled in the art to which it appertains. It will be seen that the pallets are mechanically operated at every point, that the space required in a brick-making plant is greatly reduced, that a less number of operatives is required, and the handling of the brick is reduced to a minimum. In consequence better results are obtained, the output is enlarged, and the cost of manufacture, after the first cost, is greatly reduced.

I claim as my invention—

1. In a brick-making plant having a drier, a kiln, and a brick-making machine or machines, a series of tracks leading from such machine or machines through such drier, around the kiln and back to the machine or machines, supports for the bricks movable on said tracks, and means contiguous to the latter for continously conveying said supports from the machines to the drier, thence to and from the kilns, and back to the machines, substantially as set forth.

2. In a brick-making plant, the combination with a drier having a plurality of tracks therein arranged at different altitudes, of stationary tracks beyond the ends of such drier, track-sections connecting said stationary tracks with the ends of the drier, and means for alining said track-sections with the tracks within the drier, as set forth.

3. In a brick-making plant, the combination with a drier having a series of tunnels therein, and a plurality of tracks within each tunnel, of stationary tracks beyond the ends of the drier, track-sections connecting such stationary tracks with the several tunnels of the drier, and means for alining each track-section with the tracks of each tunnel, as set forth.

4. In a brick-making plant, the combination with a drier, and tracks arranged therein at different altitudes, of stationary tracks beyond the ends of such drier, track-sections movable over the ends of the drier and connected to the stationary tracks, means for alining the track-sections with the several tracks within the drier, pallets designed to travel over such tracks and track-sections, and means for moving such pallets, as set forth.

5. In a brick-making plant, the combination with a drier having tracks arranged therein, and continuous track-rails at the receiving and discharge ends of such drier designed to coincide with the tracks in the latter, endless ropes movable over such tracks throughout their entire lengths, and pallets having wheels movable on such tracks, such ropes being designed to engage and move the pallets to the receiving end of the drier, through the latter, and from its discharge end back to the receiving end, as set forth.

6. A brick-making plant having a continuous system of track-rails, pallets having rollers movable on such track-rails, and conveyer-ropes adjacent to the track-rails throughout the entire plant designed to engage the pallets, substantially as set forth.

7. In a brick-making plant, the combination with a drier having tracks therein at different altitudes, and conveyer-ropes for moving pallets over such tracks, of movable track-sections designed to coincide with such tracks in the drier, means for shifting such track-sections, and means operated by the latter for operating the conveyer-ropes of each track within the drier, as set forth.

8. In a brick-making plant having a drier and a kiln, a plurality of tracks extending from the brick-making machines through such drier and from the latter to the kiln and back to said machines, pallets having wheels movable on such tracks, and means contiguous to each of the several tracks for moving such pallets in series over the latter, substantially as set forth.

9. In a brick-making plant having a drier and a kiln, a plurality of tracks extending from the brick-making machines through such drier and from the latter to the kiln and back to the brick-making machines, flat pallets having wheels movable on such tracks, endless ropes movable over such tracks, and cleats or buttons thereon for engaging the pallets, substantially as set forth.

10. In a brick-making plant having a kiln, a drier provided with a plurality of tunnels and tracks at different altitudes in each tunnel, a series of stationary tracks beyond the ends of the drier extending around the kiln and back to the brick-making machines, two series of movable track-sections connecting the several stationary tracks successively with the tracks of the drier, and means for conveying bricks over the several stationary tracks and track-sections, substantially as set forth.

11. The combination with the drier having tracks therein at different altitudes, endless ropes adjacent to each track, stationary tracks leading from the brick-making machines, movable track-sections leading from such stationary tracks to the tracks of the drier, and means intermediate of said sections and each of the endless ropes for operating the latter when the track-section is brought into line therewith, substantially as set forth.

12. The combination with the drier having tracks therein at different altitudes, endless ropes for each track, a shaft at one end of each track having a gear-wheel thereon, a second shaft having wheels meshing with said gear-wheel, a pinion on said second shaft, stationary tracks, movable track-sections connected to said stationary tracks and movable over the receiving end of the drier, means for raising and lowering such sections, rack-bars carried by the latter for engaging the pinion on the said second shaft, and pallets movable over said tracks and track-sections, substantially as set forth.

13. The combination with the drier having tunnels and a series of tracks in each tunnel, stationary tracks, movable track-sections leading from the latter to the receiving end of the drier, upper and lower doors carried by such sections, pallets movable on said tracks and sections, and means for moving the same, substantially as set forth.

14. A pallet having its body composed of upper and lower plates, axles projecting from the ends of such body, and wheels on such axles, substantially as set forth.

15. In a brick-making plant having tracks extending from the brick-making machines, through the drier, around the kilns and back to the said machines, corresponding endless ropes, and pallets composed of reversible flat bodies and wheels on the ends thereof designed to travel over such tracks, substantially as set forth.

16. In a brick-making plant having means for conveying pallets, wheels over which such pallets are passed, and rods designed to be projected between such pallets as the latter travel over said wheels, substantially as set forth.

17. In a brick-making plant having means for conveying pallets, wheels over which such pallets are passed, a series of rods carried by such wheels, and a disk having a cam-groove for forcing such rods outwardly between the pallets passing over the wheels, substantially as set forth.

In testimony whereof I have signed this specification in the presence of two subscribing witnesses.

CLEMENS CATESBY JONES.

Witnesses:
J. PRESTON CARSON,
ALICE FORSYTH.